(12) United States Patent
Virdi et al.

(10) Patent No.: US 7,480,315 B2
(45) Date of Patent: Jan. 20, 2009

(54) METHOD AND APPARATUS FOR SYNCHRONIZING CLOCKS

(75) Inventors: Gurpratap Virdi, Bellevue, WA (US); Jeffrey A. Davis, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 11/027,284

(22) Filed: Dec. 31, 2004

(65) Prior Publication Data
US 2006/0146850 A1 Jul. 6, 2006

(51) Int. Cl.
*H04J 3/06* (2006.01)
(52) U.S. Cl. .................. 370/509; 370/512; 370/503; 370/493
(58) Field of Classification Search ......... 370/503, 370/486, 412, 509, 512, 300, 907; 348/512; 709/203
See application file for complete search history.

(56) References Cited

U.S. PATENT DOCUMENTS

| | | | | |
|---|---|---|---|---|
| 5,652,627 | A * | 7/1997 | Allen | 348/497 |
| 5,652,749 | A | 7/1997 | Davenport et al. | |
| 5,668,601 | A * | 9/1997 | Okada et al. | 375/240.25 |
| 5,757,802 | A * | 5/1998 | Yoo | 370/474 |
| 5,771,075 | A * | 6/1998 | Rim et al. | 348/512 |
| 5,774,497 | A | 6/1998 | Block et al. | |
| 5,808,722 | A * | 9/1998 | Suzuki | 352/12 |
| 5,905,768 | A * | 5/1999 | Maturi et al. | 375/364 |
| 6,081,299 | A * | 6/2000 | Kesselring | 348/512 |
| 6,101,591 | A | 8/2000 | Foster et al. | |
| 6,115,422 | A | 9/2000 | Anderson et al. | |
| 6,356,312 | B1 * | 3/2002 | Lyu | 348/512 |
| 6,356,567 | B2 | 3/2002 | Anderson et al. | |
| 6,516,005 | B1 * | 2/2003 | Murayama et al. | 370/503 |
| 6,636,270 | B2 | 10/2003 | Gates et al. | |
| 6,738,427 | B2 | 5/2004 | Zetts | |
| 6,970,526 | B2 * | 11/2005 | Min | 375/354 |

(Continued)

FOREIGN PATENT DOCUMENTS

EP 0577329 * 1/1994

OTHER PUBLICATIONS

Lee, Yong Ju, "Transmission Method of Synchronized Streaming Data in Digital Data Broadcasting Environment," IEICE Trans. Fundamentals, vol. E87-A, No. 6, Jun. 2004, pp. 1520-1523.

(Continued)

*Primary Examiner*—Ricky Ngo
*Assistant Examiner*—Dewanda Samuel
(74) *Attorney, Agent, or Firm*—Lee & Hayes, PLLC

(57) ABSTRACT

A system receives multiple data samples and determines time stamp values associated with each of the multiple data samples. The system identifies an earliest time stamp value and uses that time stamp value as an initial system clock value. The system may also subtract a delay factor from the earliest time stamp value to account for delay in decoding the multiple data samples. The earliest time stamp value is also communicated to an audio decoder and a video decoder. The audio and video decoders provide clock data back to a component that maintains the system clock value. If the difference between the clock data received from the decoders and the system clock value exceeds a threshold value, the system clock value is recalculated.

15 Claims, 6 Drawing Sheets

U.S. PATENT DOCUMENTS

| | | | |
|---|---|---|---|
| 7,068,915 B1 * | 6/2006 | Cho | 386/68 |
| 7,230,651 B2 * | 6/2007 | Schoner et al. | 348/500 |
| 7,280,156 B2 * | 10/2007 | Roelens | 348/512 |
| 2001/0036201 A1 * | 11/2001 | Dieterich et al. | 370/506 |
| 2002/0051467 A1 * | 5/2002 | Kawakatsu | 370/474 |
| 2003/0043924 A1 * | 3/2003 | Haddad et al. | 375/240.28 |
| 2004/0001591 A1 * | 1/2004 | Mani et al. | 380/210 |

OTHER PUBLICATIONS

Schulzrinne, H. et al., "Standards Track, RTP: A Transport Protocol for Real-Time Applications," Network Working Group, The Internet Society, Jul. 2003, pp. 1-103.

* cited by examiner

| Video Clock Data | 100ms | 133ms | 166ms | 200ms | 233ms | • • • |

Fig. 3A

| Audio Clock Data | 300ms | 370ms | 440ms | 510ms | 580ms | • • • |

| Video Clock Data | 100ms | 2000ms | 2033ms | 2066ms | 2100ms | • • • |

Fig. 3C

METHOD AND APPARATUS FOR SYNCHRONIZING CLOCKS

TECHNICAL FIELD

The systems and methods described herein relate to synchronizing a receiving clock with a source clock.

BACKGROUND

In a media distribution environment, one or more source devices communicate media content to one or more receiving devices. In this environment, it is important for the source devices and the receiving devices to have synchronized clocks. Synchronizing source and receiving clocks is important, for example, to maintain synchronization between the audio and video data presented by the receiving devices. If the audio and video data is not synchronized, the audio data will not be presented at the correct time with respect to the video data. For example, if the audio and video data is not synchronized, the movement of a person's lips presented from the video data may not correspond to the spoken word(s) presented from the audio data. The audio presentation may appear to be "ahead of" or "behind" the video presentation.

Some media distribution environments include a time synchronization protocol that allows source devices and receiving devices to exchange clock information. An example time synchronization protocol may be provided via the MPEG-2 (Moving Picture Experts Group) system layer, which defines transport streams and program streams. However, other media distribution environments do not utilize a time synchronization protocol. In particular, certain networked media playback systems do not use a time synchronization protocol. These systems need to maintain synchronization between the source device clock and the receiving device clock without the benefit of a time synchronization protocol.

SUMMARY

The systems and methods described herein support the synchronization of a receiving device clock with a source device clock by using information contained within a data stream, thereby eliminating the need for an additional time synchronization protocol. In one embodiment, the receiving device clock is synthesized using the information in the data stream. Multiple data samples are received and an earliest time stamp value is identified. The earliest time stamp value is communicated to a decoder and is used as an initial system clock value. Clock data is received from the decoder. If a difference between the clock data received from the decoder and the system clock value exceeds a threshold value; the system clock value is recalculated.

BRIEF DESCRIPTION OF THE DRAWINGS

Similar reference numbers are used throughout the figures to reference like components and/or features.

FIGS. 3A-3C illustrate example clock data associated with audio and video data samples.

DETAILED DESCRIPTION

The systems and methods described herein permit the synchronization of a receiving device clock with a source device clock by using information contained within a data stream, thereby eliminating the need for an additional time synchronization protocol. These systems and methods synthesize a clock on the receiving device using the information in the data stream. Upon initialization of a data stream, a system time clock in the receiving device is set using information contained in the data stream. The system time clock in the receiving device is then incremented based on the receiving device's internal clock. Thus, the receiving device clock remains synchronized with the source device clock as long as the two clocks run at the same rate. If there is a discontinuity in the data stream, the system time clock in the receiving device is reset using information contained in the data stream.

As used herein, the term "receiving device" may also be referred to as a "receiver", a "rendering device", or a "network receiver." Additionally, the term "source device" may also be referred to as a "transmitter" or a "media transmitter." The term "data sample" may also be referred to as a "frame" or a "data frame."

Particular examples discussed herein relate to a network-based media player environment. However, the systems and methods discussed herein are applicable to any environment containing any type of source device and receiving device. Additionally, these systems and methods may be applied to any type of data communicated using any communication protocol and communication medium.

Figure 1:
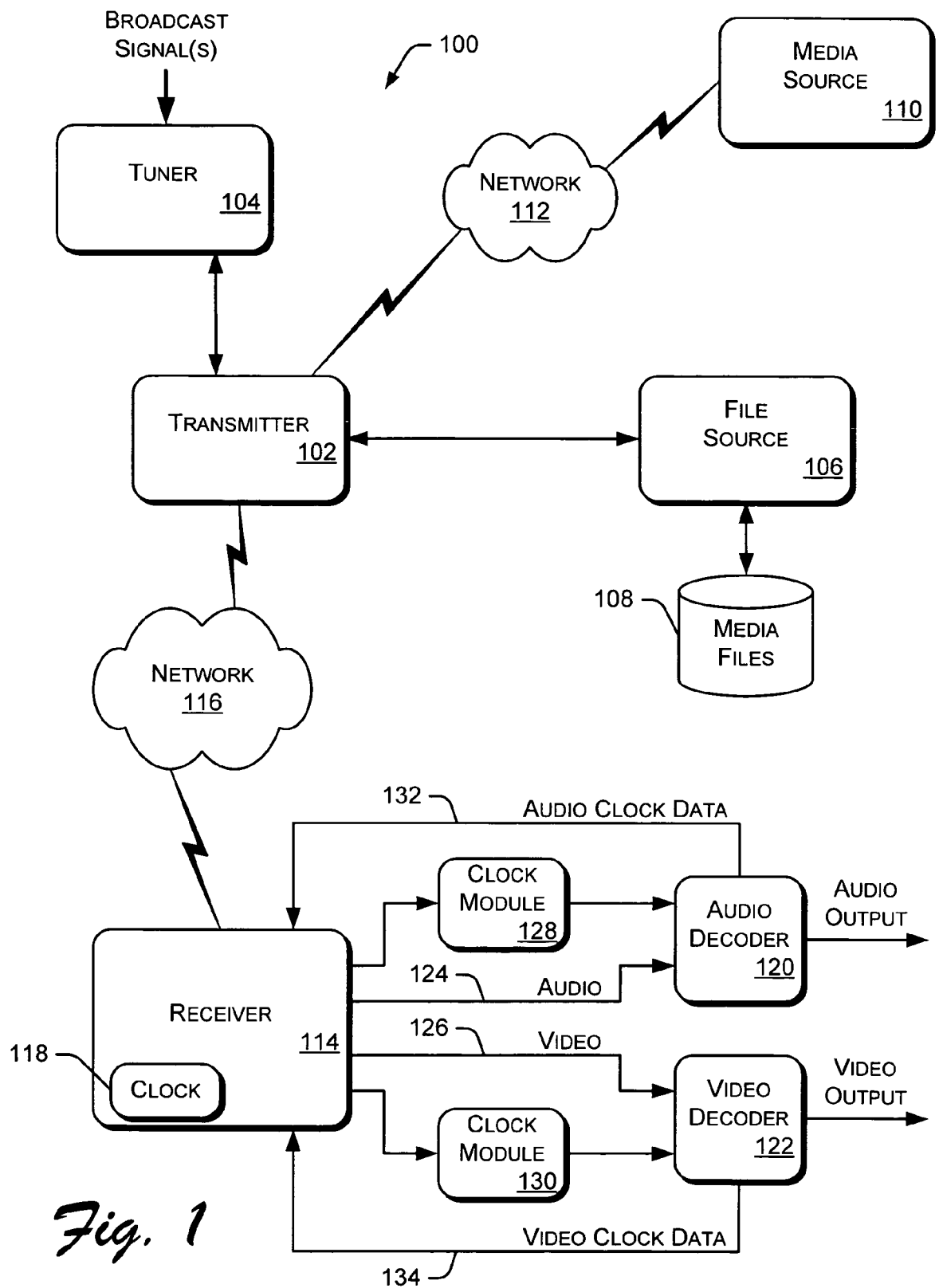
FIG. 1 illustrates an example environment in which the methods and systems described herein can be implemented.

FIG. 1 illustrates an example environment 100 in which the methods and systems described herein can be implemented. A transmitter 102 receives data (such as audio data, video data, and other media content) from multiple sources, such as a tuner 104, a file source 106, and a media source 110. Tuner 104 receives signals, such as broadcast signals, from any number of sources using various mediums. Tuner 104 may receive signals via a cable television link, a satellite communication link, an over-the-air broadcast, and the like. Tuner 104 tunes, demultiplexes, and/or encodes received signals. The tuner then provides the tuned/demultiplexed/encoded data to transmitter 102. Alternatively, tuner 104 may communicate data to file source 106, which stores the received data to a storage device 108, such as a hard disk drive. File source 106 is also capable of retrieving data from storage device 108 and providing the retrieved data to transmitter 102. File source 106 may handle any type of data, such as audio data, video data, configuration data, and the like. Storage device 108 can store various types of recorded content, such as music, movies and television programs.

Media source 110 communicates data to transmitter 102 via a data communication network 112, such as the Internet. Media source 110 may generate its own data or may receive data from another device or system (not shown) coupled to media source 110. For example, media source 110 may provide streamed audio and/or video content to transmitter 102. Transmitter 102 may receive data from any number of tuners 104, file sources 106, media sources 110, or other sources not shown in FIG. 1.

Transmitter 102 communicates data to a receiver 114 via a data communication network 116. Data communication network 116 can be any type of network capable of communicating data, such as a local area network (LAN) or the Internet. Receiver 114 receives audio and video data from transmitter 102 and manages the processing of that data such that the audio and video data is presented synchronously. Receiver 114 includes an internal clock 118 that operates as discussed herein. Receiver 114 is coupled to an audio decoder 120 and a video decoder 122 via communication links 124 and 126, respectively. Audio decoder 120 contains a digital-to-analog converter to convert received digital audio data into analog audio data. Audio decoder 120 generates an audio output that is provided to an audio rendering device (not shown), such as a speaker or similar device. Video decoder 122 contains a digital-to-analog converter to convert received digital video data into analog video data. Video decoder 122 generates a video output that is provided to a video rendering device (not shown), such as a television, projector, monitor, or other display device. In alternate embodiments, audio decoder 120 generates a digital audio signal and video decoder 122 generates a digital video signal.

Audio decoder 120 and video decoder 122 are responsible for decompressing a media stream (e.g., MPEG-1, MPEG-2, MPEG-4, or Windows Media) and delivering uncompressed output data to a renderer in a synchronized manner. A video renderer is the output section of a video pipeline and typically includes a video scaler and a video encoder. The video renderer is responsible for converting the digital image to the correct output signal format. For example, for NTSC (National Television System Committee) output, the video renderer converts the scaled and mixed digital output to an analog signal that conforms to the NTSC standard. For audio data, the renderer typically includes an audio mixer and a DAC (Digital-to-Analog Converter). The audio decoder outputs PCM samples that can be mixed by the audio mixer with local audio (e.g., user interface audio such as beeps and clicks) and transferred to an output DAC that takes a digital stream, converts the stream to an analog format, amplifies the analog signal and provides the signal to a speaker. Certain embodiments may omit the digital-to-analog conversion process.

Receiver 114 is also coupled to clock modules 128 and 130. Clock module 128 is coupled to audio decoder 120 and clock module 130 is coupled to video decoder 122. Clock modules 128 and 130 are reference clocks that are used by decoders 120 and 122, respectively, to determine when to present particular data samples. Decoders 120 and 122 use clock modules 128 and 130, respectively, to synchronize the delivery of a data sample and provide clock information (such as when to present particular frames of data) used by audio decoder 120 and video decoder 122, respectively. For example, clock module 128 provides clock information to audio decoder 120 indicating when certain frames of audio data received on communication link 124 should be presented or rendered (i.e., output from audio decoder 102 to an audio rendering device). Similarly, clock module 130 provides clock information to video decoder 122 indicating when certain frames of video data received on communication link 126 should be presented or rendered (i.e., output from video decoder 122 to a video rendering device).

Audio decoder 120 is also coupled to receiver 114 via an audio clock data communication link 132. Communication link 132 provides clock information associated with audio decoder 120 back to receiver 114. Receiver 114 uses this clock information to determine whether audio decoder 120 is using the correct time for presenting audio data. Video decoder 122 is also coupled to receiver 114 via a video clock data communication link 134. Communication link 134 provides clock information associated with video decoder 122 back to receiver 114. Receiver 114 uses the received clock information to determine whether video decoder 122 is using the correct time for presenting video data. The operation of receiver 114 and related components shown in FIG. 1 are discussed below with respect to FIGS. 2-5.

In a particular embodiment, tuner 104 is contained within a computing device along with transmitter 102 and any number of other devices. In other embodiments, transmitter 102 and tuner 104 are separate devices. FIG. 1 shows receiver 114, audio decoder 120, video decoder 122 and clock modules 128 and 130 as separate components. However any two or more of these components may be combined into a single component. Additionally, receiver 114, audio decoder 120, video decoder 122 and clock modules 128 and 130 may all be contained in a single device, such as a networked media receiver.

Although two separate clock modules 128 and 130 are shown in FIG. 1, alternate embodiments may utilize a single clock module. If two separate clock modules 128 and 130 are used (as shown in FIG. 1), the two clock modules need to be synchronized with each other. In one implementation, this synchronization is performed by seeding clock module 128 with the new stream time and starting the clock in clock module 128. Next, the audio decoder 120 is activated and the current value of clock module 128 is determined. Clock module 130 is then seeded with the current value read from clock module 128. The clock in clock module 130 is then started and the video decoder 122 is activated. A similar procedure is followed each time the clock value is re-seeded.

Figure 2:
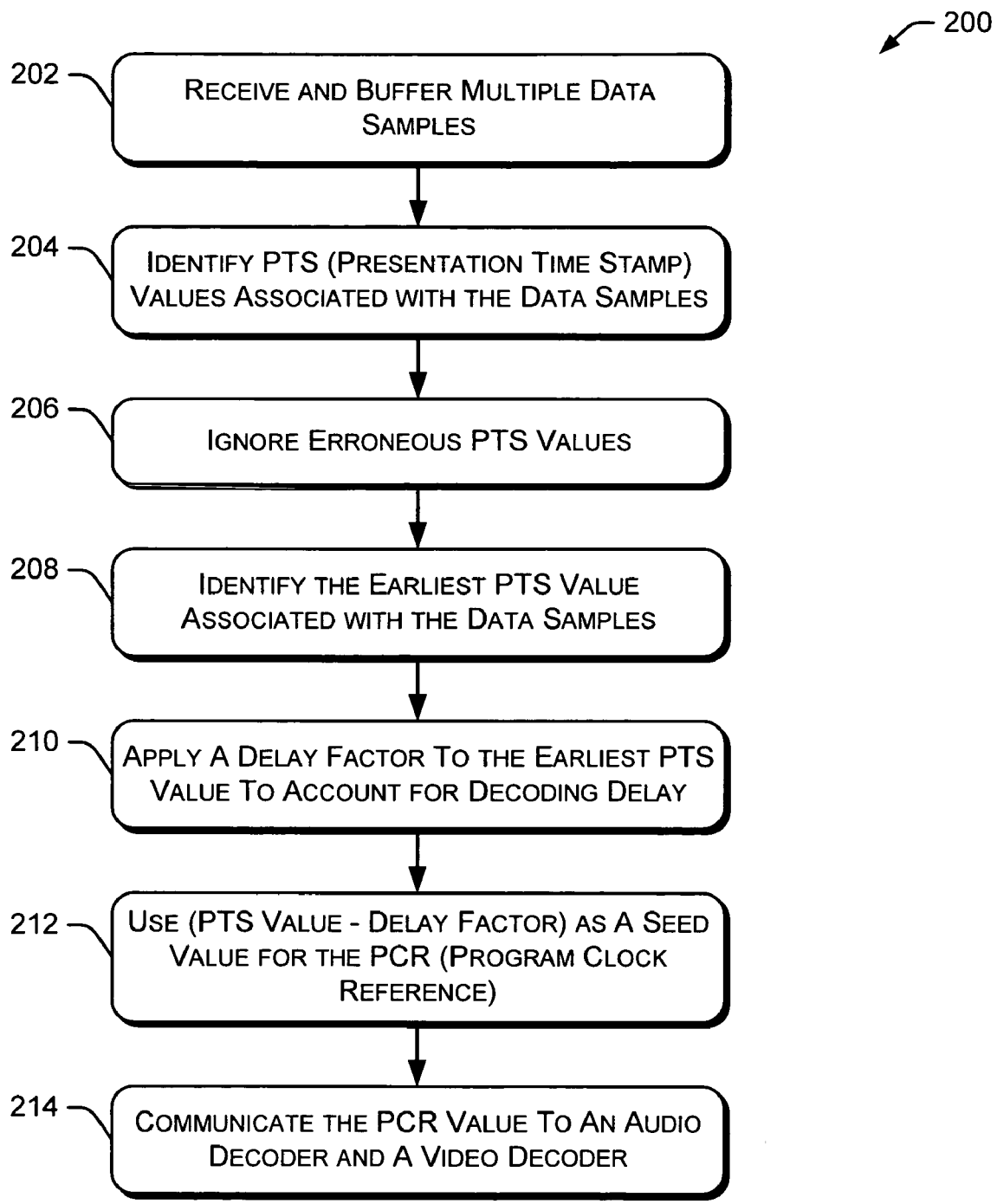
FIG. 2 is a flow diagram illustrating an embodiment of a procedure for determining initial clock data.

FIG. 2 is a flow diagram illustrating an embodiment of a procedure 200 for determining initial clock data. In the described embodiment, procedure 200 is implemented by receiver 114. Initially, procedure 200 receives and buffers multiple data samples (202). Data samples may also be referred to as "frames" or "frames of data." These data samples may include audio and/or video data. The procedure then identifies PTS (Presentation Time Stamp) values associated with the received data samples (block 204). PTS values define a time at which a data sample is to be presented. PTS values are synchronized to a PCR (Program Clock Reference) value. For example, if the PCR has a current value of 120 and the PTS value is 120, the decoder should present the data sample associated with the PTS value. PTS values are sent at periodic intervals, such as every 33 ms for video data (based on 30 frames per second) and every 70 ms for audio data. PTS values may also be referred to as "time stamp values" and a PCR value may also be referred to as a "system clock value."

Referring again to FIG. 1, audio decoder 120 compares the reference clock value provided by clock module 128 to the next data sample's PTS value. If the next PTS value and the current reference clock value provided by clock module 128 are approximately the same (e.g., within ½ of the data sample duration), audio decoder 120 will present the data sample. Similarly, video decoder 122 compares the reference clock value provided by clock module 130 to the next data sample's PTS value. If the next PTS value and the current reference clock value provided by clock module 130 are approximately the same (e.g., within ½ of the data sample duration), video decoder 122 will present the data sample.

Clock modules 128 and 130 are capable of having their reference clock values changed—e.g., seeded with a new time value based on incoming PTS values from the data stream during data stream start-up. Clock modules 128 and 130 are also capable of starting and stopping the running of their reference clocks.

FIG. 3A illustrates example PTS values associated with five received video data samples. In the example of FIG. 3A, the five PTS values are each separated by approximately 33 ms. FIG. 3B illustrates example PTS values associated with five received audio data samples. In the example of FIG. 3B, the five PTS values are each separated by approximately 70 ms. The video data samples shown in FIG. 3A do not necessarily correspond to the audio data samples shown in FIG. 3B. In a particular embodiment, the PTS values associated with audio data share the same frequency domain as PTS values associated with corresponding video data. For example, the frequency domain for MPEG-2 is a derivative of 27 Mhz in which 90 Khz is the base. Audio and video data samples contain a PTS value for the respective data sample they describe. In this embodiment, all audio data samples include a PTS value and every third or fourth video data sample includes a PTS value. The source of the data samples includes a number of PTS values to ensure that the audio decoder and the video decoder provide a synchronous delivery of data.

Referring back to FIG. 2, after identifying PTS values associated with the received data samples, any erroneous data samples are ignored (block 206). FIG. 3C illustrates an example of an erroneous PTS value. PTS value 302 is inconsistent with the other four PTS values. The other four PTS values are spaced apart by approximately 33 ms, which is appropriate for 30 frames/sec. video data. However, PTS value 302 is not consistent with this spacing and is considered erroneous. Thus, erroneous data samples are identified by finding irregularities in the time spacing of PTS values. If a particular data sample has a PTS value that is significantly different from the other PTS values, that data sample is ignored. For example, in the case of 30 frames/sec. video data, a difference in PTS values significantly greater than 33 ms indicates an erroneous value.

Procedure 200 continues by identifying the earliest PTS value associated with the data samples (block 208). For example, in FIG. 3A, the earliest PTS value is 100 ms. Similarly, in FIG. 3C, the earliest non-erroneous PTS value is 2000 ms (the erroneous PTS value of 100 ms is ignored). By identifying the earliest PTS value, the procedure accounts for the possibility that data samples were not necessarily received in chronological order. In one implementation, the first five PTS values are identified. If one or more of the first five data samples are chronologically out of order, the procedure selects the earliest PTS value among the five values, thereby avoiding the situation where the starting PTS value is later than other received PTS values.

When seeding (or re-seeding) the clock based on incoming PTS values, the system considers PTS values from both the audio data stream and the video data stream. Although the various PTS values will have the same time domain, the PTS values may have different arrival times due to network congestion, processor overload, etc. In one embodiment, PTS values associated with several audio samples and several video samples are evaluated to identify the earliest PTS value.

After identifying the earliest PTS value, the procedure applies a delay factor to the PTS value to account for decoding delay (block 210). This decoding delay occurs, for example, as receiver 114, audio decoder 120 and video decoder 122 process audio and video data to generate audio output and video output. In one implementation, this decoding delay is a constant value determined based on testing of the decoding components or by estimating the delay. Alternatively, the decoding delay may vary based on current processing delays, system usage and the like. The use of a decoding delay is optional. Alternate embodiments omit block 210 and do not consider a decoding delay when calculating PCR values discussed below.

Procedure 200 continues by using the earliest PTS value minus the delay factor as a seed value for the PCR value (block 212). This seed PCR value is stored in clock 118 contained in receiver 114. The seed PCR value is then communicated to the audio decoder and the video decoder (block 214). For example, receiver 114 communicates the PCR value to clock modules 128 and 130, which then provide the PCR value to audio decoder 120 and video decoder 122, respectively. Clock modules 128 and 130 regulate playback of data by audio decoder 120 and video decoder 122, respectively. At this point, the receiver and related decoding components begin processing received data samples as discussed below.

Figure 4:
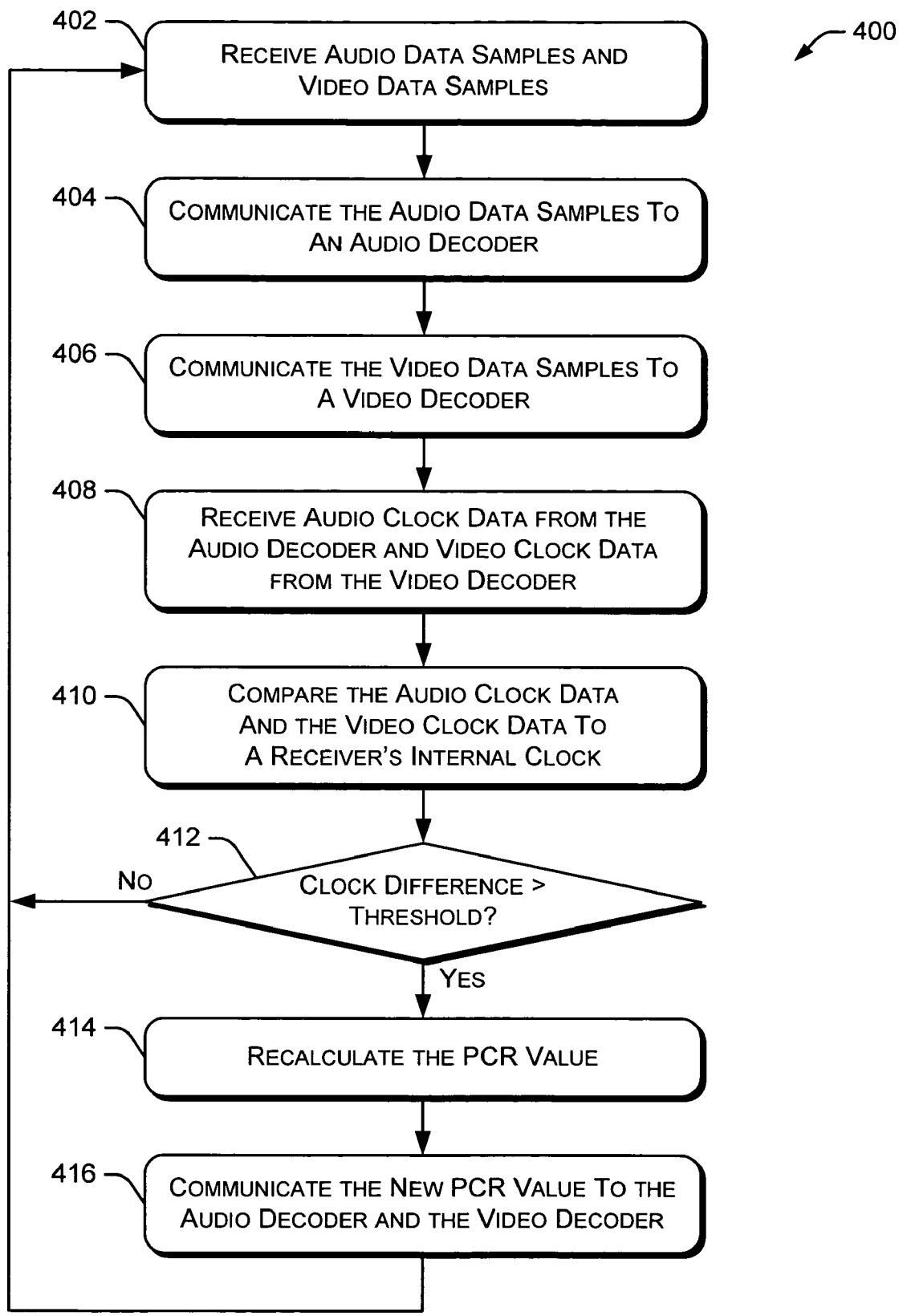
FIG. 4 is a flow diagram illustrating an embodiment of a procedure for processing data.

FIG. 4 is a flow diagram illustrating an embodiment of a procedure 400 for processing data. Initially, audio data samples and video data samples are received (block 402), for example, by receiver 114. The received audio data samples are communicated to an audio decoder (block 404), such as audio decoder 120. The received video data samples are communicated to a video decoder (block 406), such as video decoder 122. Procedure 400 continues by receiving audio clock data from the audio decoder and video clock data from the video decoder (block 408). In the example of FIG. 1, the audio clock data is received on communication link 132 and the video clock data is received on communication link 134. The audio clock data and the video clock data identifies the time associated with the data that the audio decoder and video decoder are currently presenting. In one implementation, the audio decoder and the video decoder provide audio clock data and video clock data at regular intervals (e.g., when presenting each data sample). Alternatively, the receiver may periodically request that the audio decoder and the video decoder send their current clock data to the receiver.

The procedure continues by comparing the audio clock data and the video clock data to a receiver's internal clock (block 410), such as clock 118 in receiver 114. If the difference between the audio or video clock data and the receiver's internal clock does not exceed a threshold value (block 412), then the procedure returns to block 402 and continues receiving audio data samples and video data samples. However, if the difference between the audio or video clock data and the receiver's internal clock exceeds a threshold value (block 412), then the procedure recalculates the PCR value (block 414). A difference that exceeds the threshold value indicates a discontinuity in the data stream caused, for example, by dropped frames, errors in the data stream, or processing errors. Recalculation of the PCR value is discussed below with respect to FIG. 5. In a particular embodiment, the threshold value is a constant value that is equal to ½ the video data sample rate. For example, if the video data sample rate is 30 samples per second (or 30 frames per second), the threshold value is (½(1/30)sec), which equals 16.6667 ms.

After recalculating the PCR value, the procedure communicates the new PCR value to the audio decoder and the video decoder (block 416). In the example of FIG. 1, the PCR value is communicated to the audio decoder and the video decoder via clock modules 128 and 130, respectively. The procedure then returns to block 402 and continues receiving audio data samples and video data samples.

Figure 5:
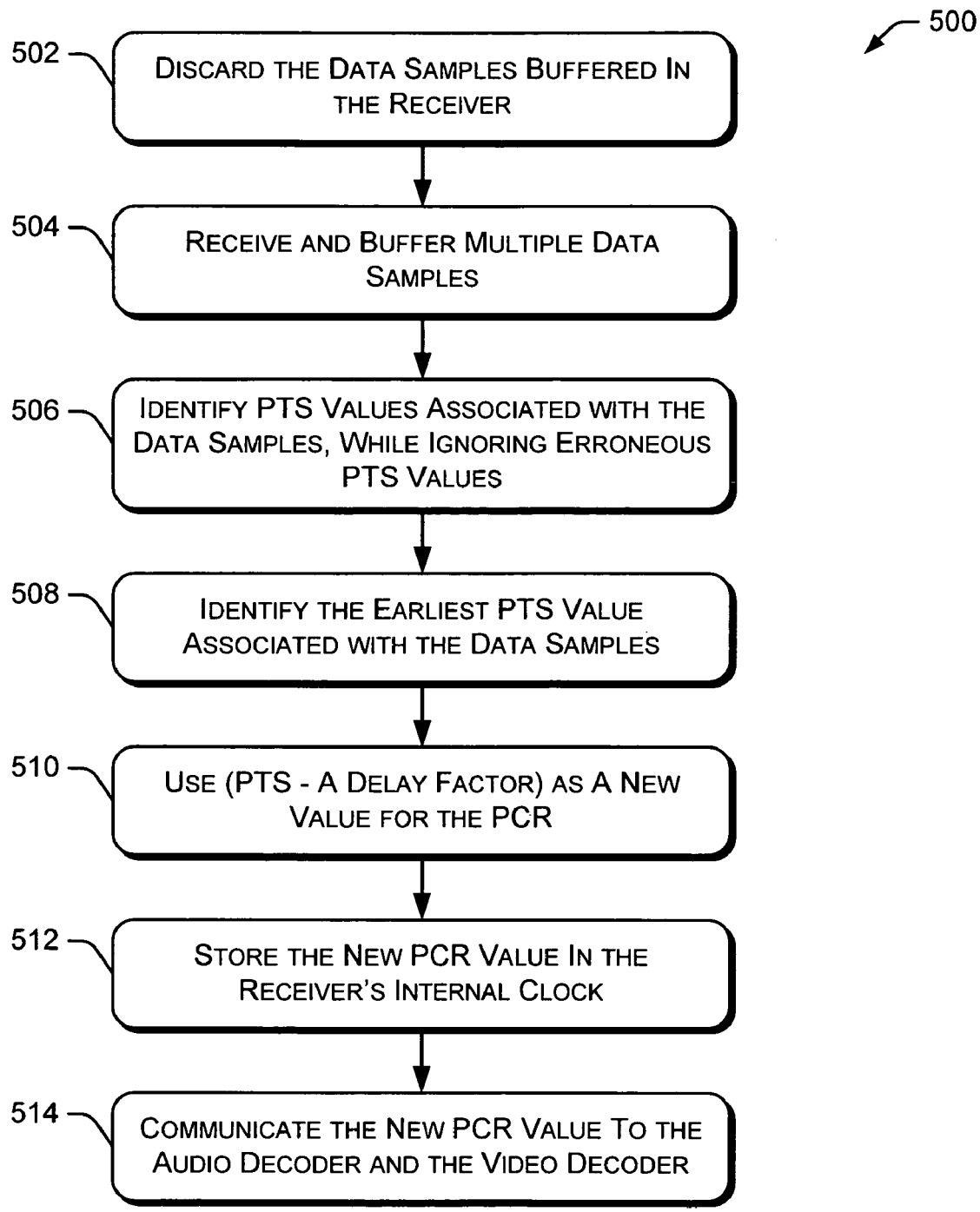
FIG. 5 is a flow diagram illustrating an embodiment of a procedure for handling discontinuities in the audio data and/or the video data.

FIG. 5 is a flow diagram illustrating an embodiment of a procedure 500 for handling discontinuities in the audio data and/or the video data. Initially, procedure 500 discards all data samples buffered in the receiver (block 502). The procedure then receives and buffers multiple data samples (block 504). Next, PTS values associated with the data samples are identified, while ignoring erroneous PTS values (block 506). As discussed above with respect to FIG. 2, erroneous PTS values are not considered. The procedure then identifies the earliest PTS value associated with the data samples (block 508). The delay factor (discussed above) is subtracted from the PTS value to determine a new value for the PCR (block 510). The new PCR value is stored in the receiver's internal clock (block 512), such as clock 118 in FIG. 1. The new PCR value is then communicated to the audio decoder and the video decoder (block 514). The receiver then begins processing data in the manner discussed above with respect to FIG. 4. By using the procedure of FIG. 5, playback of the data stream is disrupted temporarily, but eliminates the need to return to the beginning of the data stream and count forward to resynchronize the clocks.

Figure 6:
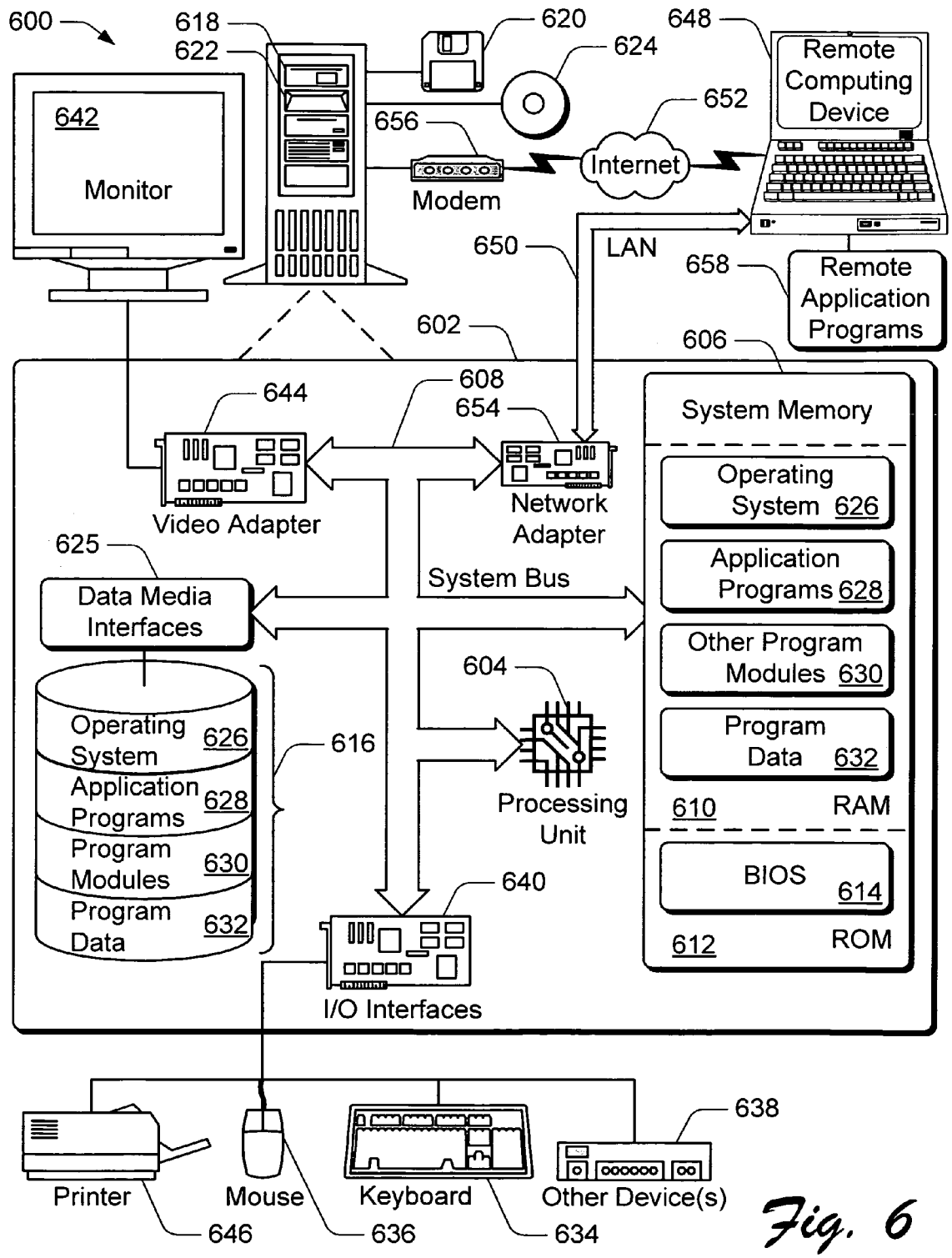
FIG. 6 illustrates a general computer environment, which can be used to implement the techniques described herein.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604 (optionally including a cryptographic processor or co-processor), a system memory 606, and a system bus 608 that couples various system components including the processor 604 to the system memory 606.

The system bus 608 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, game console, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving a plurality of data samples;
   identifying an earliest time stamp value associated with the plurality of data samples;
   communicating the earliest time stamp value to a decoder, wherein the earliest time stamp value is used as an initial system clock value;
   receiving clock data from the decoder; and
   recalculating the system clock value if a difference between the clock data received from the decoder and the system clock value exceeds a threshold value, wherein recalculating the system clock value includes communicating the recalculated system clock value to the decoder, and wherein identifying the earliest time stamp value includes ignoring any erroneous time stamp values.

2. A method as recited in claim 1 further comprising subtracting a delay factor from the earliest time stamp value.

3. A method as recited in claim 2 wherein the delay factor is associated with a delay in decoding the plurality of data samples.

4. A method as recited in claim 1 further comprising discarding buffered data samples if the difference between the clock data received from the decoder and the system clock value exceeds the threshold value.

5. A method comprising:
   communicating audio data samples to an audio decoder;
   communicating video data samples to a video decoder;
   receiving audio clock data from the audio decoder, wherein the audio clock data identifies a time associated with audio data being presented;
   receiving video clock data from the video decoder, wherein the video clock data identifies a time associated with video data being presented;
   determining a first difference between the audio clock data and a system clock value;
   determining a second difference between the video clock data and the system clock value;
   recalculating the system clock value if the first difference or the second difference exceeds a threshold value, wherein recalculating the system clock value includes discarding data samples buffered in a receiver; and
   communicating the earliest time stamp value to the audio decoder and the video decoder.

6. A method as recited in claim 5 wherein recalculating the system clock value includes:
   discarding data samples buffered in a receiver;
   receiving a plurality of new data samples;
   determining time stamp values associated with the plurality of new data samples;
   identifying an earliest time stamp value; and
   using the earliest time stamp value as the new system clock value.

7. A method as recited in claim 5 wherein recalculating the system clock value includes communicating the recalculated system clock value to the audio decoder and the video decoder.

8. A method as recited in claim 5 wherein the system clock value is maintained in a receiving device that receives the audio data samples and the video data samples.

9. A method as recited in claim 8 wherein the receiving device periodically requests audio clock data from the audio decoder.

10. A method as recited in claim 8 wherein the receiving device periodically requests video clock data from the video decoder.

11. A computer-readable storage medium having stored thereon computer program instructions that, when executed by a processor, causes the processor to:
    receive a plurality of data samples;

determine time stamp values associated with each of the plurality of data samples;

identify an earliest time stamp value, ignoring any erroneous time stamp values when identifying the earliest time stamp value;

subtract a delay factor from the earliest time stamp value to obtain an initial system clock value;

receive clock data from a decoder:

determine a difference between the clock data and a current system clock value; and recalculate the system clock if the difference between the clock data and the current system clock value exceeds a threshold value.

12. The computer-readable storage medium as recited in claim 11 wherein the delay factor is associated with a delay in decoding the received data samples.

13. The computer-readable storage medium as recited in claim 11 wherein the processor further communicate the system clock value to an audio decoder and a video decoder.

14. The computer-readable storage medium as recited in claim 11 wherein the clock data is audio clock data and the decoder is an audio decoder.

15. The computer-readable storage medium as recited in claim 11 wherein the clock data is video clock data and the decoder is a video decoder.

* * * * *

UNITED STATES PATENT AND TRADEMARK OFFICE
CERTIFICATE OF CORRECTION

| | | |
|---|---|---|
| PATENT NO. | : 7,480,315 B2 | |
| APPLICATION NO. | : 11/027284 | |
| DATED | : January 20, 2009 | |
| INVENTOR(S) | : Gurpratap Virdi et al. | |

It is certified that error appears in the above-identified patent and that said Letters Patent is hereby corrected as shown below:

In column 11, line 8, in Claim 11, delete "decoder:" and insert -- decoder; --, therefor.

Signed and Sealed this
Tenth Day of May, 2011

David J. Kappos
*Director of the United States Patent and Trademark Office*